US006947169B2

(12) United States Patent
Nitta

(10) Patent No.: US 6,947,169 B2
(45) Date of Patent: Sep. 20, 2005

(54) APPARATUS AND METHOD FOR IMAGE FEATURE AMOUNT ACQUISITION AND MEDIUM RECORDING IMAGE FEATURE AMOUNT ACQUISITION PROGRAM, APPARATUS AND METHOD FOR IMAGE CORRECTION AND MEDIUM RECORDING IMAGE CORRECTING PROGRAM, AND PRINTING APPARATUS AND METHOD AND MEDIUM RECORDING PRINTING PROGRAM

(75) Inventor: Takashi Nitta, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 964 days.

(21) Appl. No.: 09/770,234

(22) Filed: Jan. 29, 2001

(65) Prior Publication Data

US 2001/0050775 A1 Dec. 13, 2001

(30) Foreign Application Priority Data

Jan. 31, 2000 (JP) ........................................ 2000-027273

(51) Int. Cl.[7] .............................. G06F 15/00; G06K 1/00
(52) U.S. Cl. ......................... 358/1.2; 358/462; 382/172; 345/670; 715/838
(58) Field of Search .................. 358/1.2, 462; 345/660, 345/670; 715/838; 382/168, 176, 162

(56) References Cited

U.S. PATENT DOCUMENTS 3,496,543 A * 2/1970 Greenly ....................... 382/176

6,016,354 A * 1/2000 Lin et al. ..................... 382/117
6,597,471 B1 * 7/2003 Yoshikawa ................... 358/1.2

FOREIGN PATENT DOCUMENTS

| EP | 0 931 663 A2 | 7/1997 | |
| JP | 8-340457 | 12/1996 | ............ H04N/1/52 |
| JP | 2000-137805 | 5/2000 | ............. G06T/5/00 |

OTHER PUBLICATIONS

Patent Abstract of Japan 08340457, Dec. 24, 1996.
Patent Abstract of Japan 2000137805, May 16, 2000.
Japanese Abstract No. 08340357, dated Dec. 24, 1996.

* cited by examiner

*Primary Examiner*—Joseph Mancus
*Assistant Examiner*—Yixing Qin
(74) *Attorney, Agent, or Firm*—Sughrue Mion, PLLC

(57) ABSTRACT

As image data have come to be used in large volumes in recent years, statistical calculation processing of restored and sampled image data often suffers a shortage of memory capacity. In acquiring a feature amount of an image to automatically correct image data, where high-speed processing is preferred, it is judged whether the image data contain thumbnail data (step 108) and, when there are thumbnail data, "thumbnail" is set on a sampling flag (step 110) to secure a buffer for developing the thumbnail data (step 116 and step 120), the thumbnail data are developed in the buffer, and all the pixels are subjected to statistical calculation (step 126 through step 132), resulting in faster processing than where the original image data are developed and sampled.

24 Claims, 14 Drawing Sheets

APPARATUS AND METHOD FOR IMAGE FEATURE AMOUNT ACQUISITION AND MEDIUM RECORDING IMAGE FEATURE AMOUNT ACQUISITION PROGRAM, APPARATUS AND METHOD FOR IMAGE CORRECTION AND MEDIUM RECORDING IMAGE CORRECTING PROGRAM, AND PRINTING APPARATUS AND METHOD AND MEDIUM RECORDING PRINTING PROGRAM

BACKGROUND OF THE INVENTION

1. Field of the Invention

The present invention relates to an apparatus and method for image feature amount acquisition and a medium recording thereon an image feature amount acquisition program, an apparatus and method for image correction and a medium recording thereon an image correcting program, and a printing apparatus and method and a medium recording thereon a printing program.

2. Description of the Related Art

There has conventionally been known a printing apparatus which enables a color ink jet printer to read from a detachable memory card and to read image data of the JPEC system recorded on the memory card and print them into color images.

In this printing apparatus, in addition to converting image data into print data, image processing to render the images more beautiful is automatically set and executed. In order to realize image processing and the like, the apparatus is provided with an image processing section besides a mechanical control section for processing mechanical processing. The image processing section, though provided with a CPU, a memory and the like, has only a small-capacity memory because of a storage capacity constraint unlike a usual personal computer.

In order to automatically set image processing, this printing apparatus samples image data of the JPEC system, after restoring them, to reduce the number of pixels and carries out statistical calculation processing. Then on the basis of the results of statistical calculation, it determines parameters of image processing, and supplies print data to the mechanical control section while restoring the image data again. Then, the mechanical control section performs color printing while appropriately controlling ink discharging from the print head, the shifting of the print head and paper feeding.

The above-described printing apparatus according to the prior art involves the following problem.

Since image processing is automatically accomplished as preliminary processing for printing, image data should be sampled after restoring them and subjected to statistical calculation processing. However, as the data are compressed by the JPEG system, they cannot be sampled without developing an equivalent of at least a prescribed number of lines into a bit map image, and the large quantity of image data which is usually encountered in recent years sometimes overflows the memory capacity.

SUMMARY OF THE INVENTION

In view of the above-noted problem, an object of the present invention is to provide an apparatus and method for image feature amount acquisition and a medium recording thereon an image feature amount acquisition program, an apparatus and method for image correction and a medium recording thereon an image correcting program, and a printing apparatus and method and a medium recording thereon a printing program in all of which features of image data can easily be found even where the memory capacity is restricted.

In order to achieve the above-stated object, the present invention provides an image feature amount acquisition apparatus for acquiring a feature amount of an image by subjecting image data of the image expressed in pixels in a dot matrix form to statistical calculation processing, the apparatus comprising a thumbnail presence/absence judging unit which judges whether said image data have thumbnail data in addition to an original image data, a thumbnail statistical calculation unit which acquires thumbnail data from said image data and performs statistical calculation for them, a sampling and statistical calculation unit which samples said original image data and performs statistical calculation for the sampled data, a precision selecting unit which selects a level of precision required for said feature amount, a statistical calculation selecting unit which selects either said thumbnail statistical calculation unit or said sampling and statistical calculation unit by using the result of selection by said precision selecting unit and the result of judgment by said thumbnail presence/absence judging unit, and a feature amount acquisition unit which acquires a feature amount characterizing said original image data by using the obtained statistical calculation result.

In the foregoing configuration of the invention, the thumbnail presence/absence judging unit image data judges whether the image data have thumbnail data in addition to the original image data. The selecting unit selects the level of precision required for the feature amount. The statistical calculation selecting unit selects either the thumbnail statistical calculation unit or the sampling and statistical calculation unit for statistical calculation by using the result of selection by the precision selecting unit.

Hereupon, as an example of the way of selection, the statistical calculation selecting unit is so configured as to select the thumbnail statistical calculation unit when there are thumbnail data and the level of precision required for the feature amount is not so high and to select the sampling and statistical calculation unit in other cases.

Basically, when there are thumbnail data, the thumbnail statistical calculation unit performs statistical calculation on these thumbnail data or when there are no thumbnail data, the sampling and statistical calculation unit can sample the original image data and perform statistical calculation for the sampled data. However, it is unknown how accurately the features of the original image data are succeeded by the thumbnail data in the process of data generation. Therefore, sampling-based statistical calculation is performed when the level of precision required for the feature amount is high even if there are thumbnail data. Then, when the result of statistical calculation is obtained, it is used by the feature amount acquisition unit to acquire a feature amount characterizing the original image data.

Thus, because there may be thumbnail data depending on the standard of image data, when there are thumbnail data, they are treated similarly to the result of sampling of the original image data wherever possible and utilized for statistical calculation.

An OS is usually responsible for the development of a JPEG file in an OS-equipped personal computer which is subject to little memory constraint. Accordingly, even a JPEG file would involve no heavy workload of sampling. Even where the OS is not responsible for that, a JPEG file can be easily developed if the memory constraint is not so tight.

However, development of a JPEG file to subject it to statistical calculation processing in a situation where the memory availability is limited would be tremendously time consuming, and if this process has to be gone through only for pre-treatment, it will be undesirable.

Usually, thumbnail is generated for the purpose of reducing the original image data, and accordingly does not reproduce the features of the original image data. Therefore, it was previously inconceivable to identify features of the original image data from thumbnail data.

Against this background, the present invention carries out statistical calculation processing on thumbnail data without developing a JPEG file, which consists of the original image data.

However, since preparation of thumbnail data does not involve sampling of the original image data as stated above, they do not necessarily represent a feature amount of the original image data. Therefore, where it is desired to obtain a high-precision feature amount, the original image data are sampled and statistical calculation is performed for the sampled image data, instead of performing statistical calculation on thumbnail data.

As described above, as the invention uses thumbnail data contained in image data, it can provide an image feature amount acquisition apparatus for making it possible to know features of image data in a simplified manner even in a situation where the memory availability is limited. Since the overall volume of thumbnail data to be read is rather small, the time taken to access a file is radically shortened and high speed can be achieved.

Further, where a feature amount is desired to be acquired with high precision, statistical calculation using thumbnail data is refrained from, and well balanced processing with no undue priority on high speed alone can be provided to users.

Of course, the technique of selecting statistical calculation is not restricted to the above-described, but the differentiation of precision levels can be made finer, or the presence or absence of thumbnail can be judged on the basis of features of thumbnail to vary the combination as appropriate.

Further, according to another aspect of the invention, there is provided a configuration in which the precision level of the feature amount matches the image quality required in image correction processing.

The feature amount of image data, though not directly used or designated by the user, is indirectly designated on a routing basis. For this reason in the above-described configuration of the invention, where high image quality is desired in image correction processing, it is judged that a feature amount of a high precision level is required, or where high speed rather high image quality is desired in image correction processing, a feature amount of a low precision level is required.

In this way, the user has only to understand the concept of image quality, and the selection is automated to increase simplicity and convenience.

Further, according to another aspect of the invention, the thumbnail data are recorded in a compressed form, and the thumbnail statistical calculation unit develops, with respect to compressed thumbnail data, pixels equivalent to a prescribed number of lines, performs statistical calculation for the developed image data and repeats this sequence until it is finished for all the lines.

As the thumbnail data themselves are also recorded in a compressed form in the above-described configuration, the thumbnail statistical calculation develops pixels equivalent to a prescribed number of lines, performs statistical calculation for the developed image data and repeats this sequence until it is finished for all the lines.

Thus, even though thumbnail data are processed, the work area required at a time is equivalent to only a prescribed number of lines in a thumbnail image reduced in size.

In this way, even though compressed thumbnail data are processed, statistical calculation can be accomplished with a further saving in memory capacity that is used.

Further, in another aspect, the invention provides a configuration in which the thumbnail statistical calculation unit secures a buffer in which at least two units of bit map images each in the smallest developable unit can be recorded, develops the bit map images in succession and performs statistical calculation for the developed bit map images.

In carrying out statistical calculation for a feature amount of an image, it is also necessary to take into account the relationship between the pixels taken note of and the pixels around them, but for this purpose it is insufficient only to develop the smallest unit of the bit map image, because in this way it is impossible to obtain pixels adjoining in the outermost part. For this reason, development of a two-unit equivalent makes it possible to obtain the adjoining pixels.

Further, in a configuration according to another aspect of the invention, the thumbnail statistical calculation unit acquires an image size in advance, and starts statistical calculation after computing and securing a required buffer capacity.

Where the memory constraint is great, the available buffer area also significantly affects the efficiency of computation processing, and for this reason the minimum required buffer capacity is secured in advance of statistical calculation.

Further, in another aspect, the invention provides an image correcting apparatus for acquiring a feature amount of an image by subjecting image data of the image expressed in pixels in a dot matrix form to statistical calculation processing, determining correcting parameters by using the feature amount, and correcting the image, the apparatus comprising a thumbnail presence/absence judging unit which judges whether the image data have thumbnail data in addition to the original image data, a thumbnail statistical calculation unit which acquires thumbnail data from the image data and performs statistical calculation for the thumbnail data, a sampling and statistical calculation unit which samples the original image data and performs statistical calculation for the sampled data, a selecting unit which selects the level of precision required for the feature amount, a statistical calculation selecting unit which selects either the thumbnail statistical calculation unit or the sampling and statistical calculation unit by using the result of selection by the precision selecting unit and the result of judgment by the thumbnail presence/absence judging unit, a feature amount acquisition unit which acquires a feature amount characterizing the original image data by using the obtained statistical calculation result, a parameter computing unit which computes correcting parameters by using the feature amount, and an image correcting unit which subjects the original image data to image correction processing by using the computed correcting parameters.

In the above-described configuration, image correcting parameters are set after obtaining a feature amount as described above. Thus, since the parameter computing unit computes correcting parameters by using the obtained feature amount, the image correcting unit subjects the original image data to image correction processing by using the computed correcting parameters.

Further, a configuration according to another aspect of the invention is provided with an image data selecting unit which selects image data from a memory card recording thereon the image data including the original image data in a compressed form, an image quality selecting unit which selects the quality level of image processing, an image data reading unit which reads the selected image data out of the memory card, a thumbnail presence/absence judging unit which judges whether the image data have thumbnail data in addition to the original image data, a thumbnail statistical calculation unit which acquires thumbnail data from the image data and performs statistical calculation for the thumbnail data, a sampling and statistical calculation unit which samples the original image data and performs statistical calculation for the sampled data, a statistical calculation selecting unit which causes either the thumbnail statistical calculation unit or the sampling statistical calculation unit to perform statistical calculation by using the result of judgment by the thumbnail presence/absence judging unit and the result of selection by the image quality selecting unit, a feature amount acquisition unit which acquires a feature amount characterizing the original image data by using the obtained statistical calculation result, a parameter computing unit which computes correcting parameters by using the feature amount, an image correcting unit which subjects the original image data to image correction processing while restoring them by using the computed correcting parameters, and a printing unit which executes printing on the basis of the original image data having undergone image correction.

In the above-described configuration, image data including the original image data in a compressed form are recorded on the memory card. The image data selecting unit selects the image data from the memory card. As the image quality selecting unit selects the quality level of image processing, the image data reading unit reads the selected image data out of the memory card. Then, the thumbnail presence/absence judging unit judges whether the image data have thumbnail data in addition to the original image data. The statistical calculation selecting unit causes either the thumbnail statistical calculation unit or the sampling and statistical calculation unit to perform statistical calculation by using the result of judgment by the thumbnail presence/absence judging unit and the result of selection by the image quality selecting unit. Thus, when the thumbnail statistical calculation unit is selected, thumbnail data are acquired out of the image data and subjected to statistical calculation or, when the sampling and statistical calculation unit is selected, the original image data are sampled and subjected to statistical calculation.

Next, as the feature amount acquisition unit acquires a feature amount characterizing the original image data by using the obtained statistical calculation result, the parameter computing unit computes correcting parameters by using the feature amount, and the image correcting unit subjects the original image data to image correction processing while restoring them by using the computed correcting parameters. Then, the printing unit executes printing on the basis of the original image data having undergone the image correction.

Thus, while reading image data out of the memory card and printing them after subjecting them to prescribed correction as an integrated printing apparatus, the apparatus performs statistical calculation for correcting parameters on the basis of thumbnail data, resulting in a reduced length of time required for pre-treatment.

Thus, it can be readily understood that the technique to substitute thumbnail data for the original image data in statistical calculation need not be confined to a substantive apparatus, but can be function as a method to achieve the purpose. For this reason, it can be configured as an image feature amount acquisition method, an image correcting method and a printing method. Thus there is no question that it is not necessarily confined to a substantive apparatus, but can also be effective as a method to achieve the purpose.

Incidentally, such an image feature amount acquisition apparatus can either exist by itself or be incorporated into some other hardware to serve its purpose. The idea underlying the invention is not limited to what has been described so far, but can include many other modes of implementation. Therefore it can be either software or hardware, and its use can be altered as appropriate.

It should be acknowledged that, where the idea underlying the invention is materialized as software for an image feature amount acquisition apparatus, it can obviously be present on a recording medium on which the software is recorded and used as such.

For this reason, it can also be configured as a medium recording thereon an image feature amount acquisition program, a medium recording thereon an image correcting program, and a medium recording thereon a printing program. Thus, it is not necessarily confined to a substantive apparatus, but there is no doubt that it can also be effective as a medium recording thereon software for controlling a computer.

Of course, the recording medium may be a magnetic recording medium or a photo-electromagnetic recording medium, or exactly the same will apply to any appropriate recording medium that may be developed in the future.

Furthermore, even where one part is realized in software and another in hardware, there is no difference whatsoever in the idea underlying the invention, and a mode wherein part is stored on a recording medium and appropriately read in as required also is acceptable.

It can be understood that, where the invention is realized in software, it can either be configured so as to use hardware and an operating system or be realized separately from them. Even if it is actually realized with the intervention of an operating system, the program by itself can be understood as being able to carry out the invention in the process of distribution of media recording the program thereon.

Where the invention is implemented in software, it goes without saying that not only the invention is realized as a medium recording thereon the pertinent program but also the invention is realized in the program itself, which, too, is included in the scope of the invention.

DESCRIPTION OF THE PREFERRED EMBODIMENTS

Preferred embodiments of the present invention will be described below with reference to the accompanying drawings.

Figure 1:
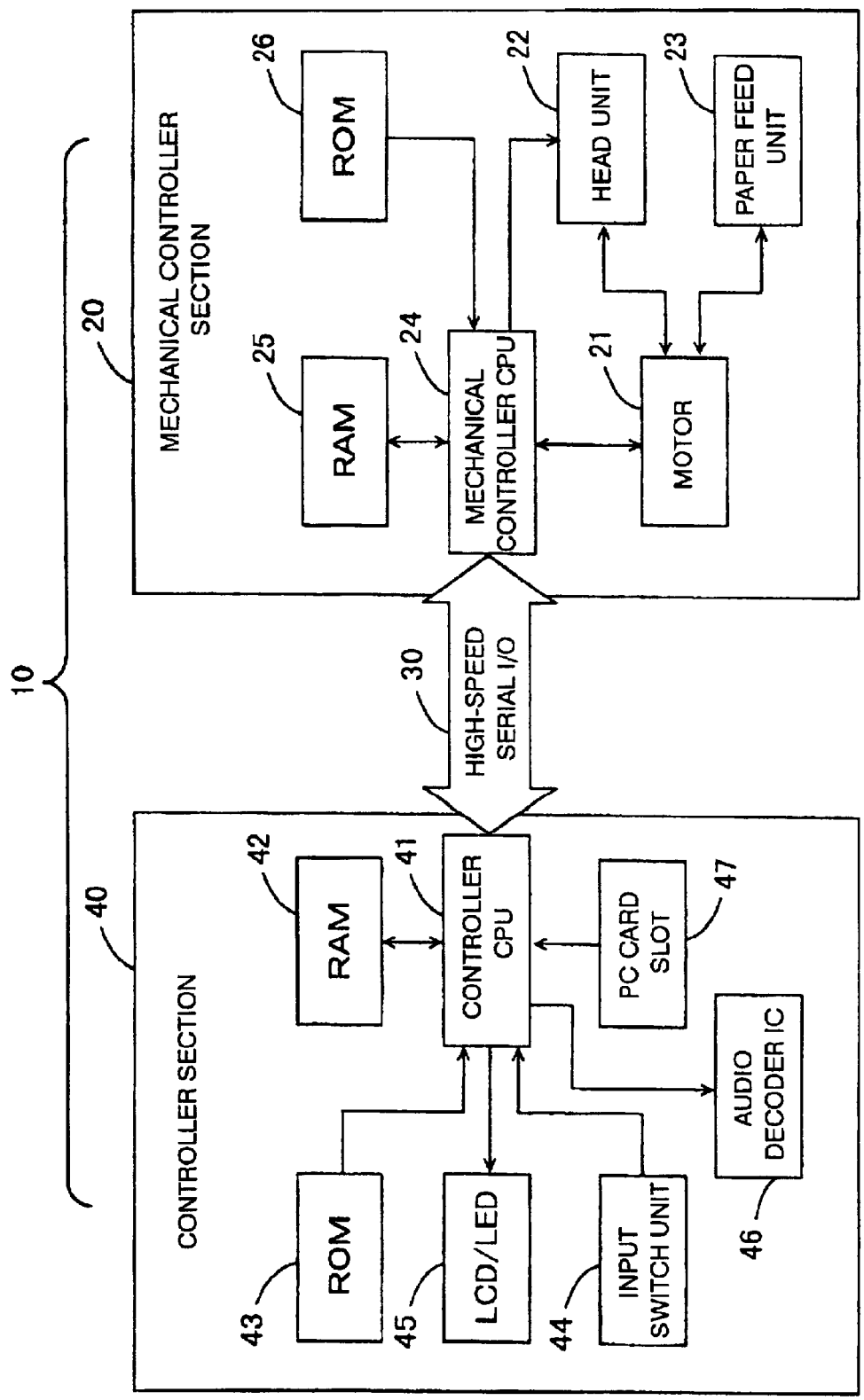
FIG. 1 is a schematic block diagram of a color ink jet printer to which is applied an image feature amount acquisition apparatus, which is a preferred embodiment of the present invention.
Figure 2:
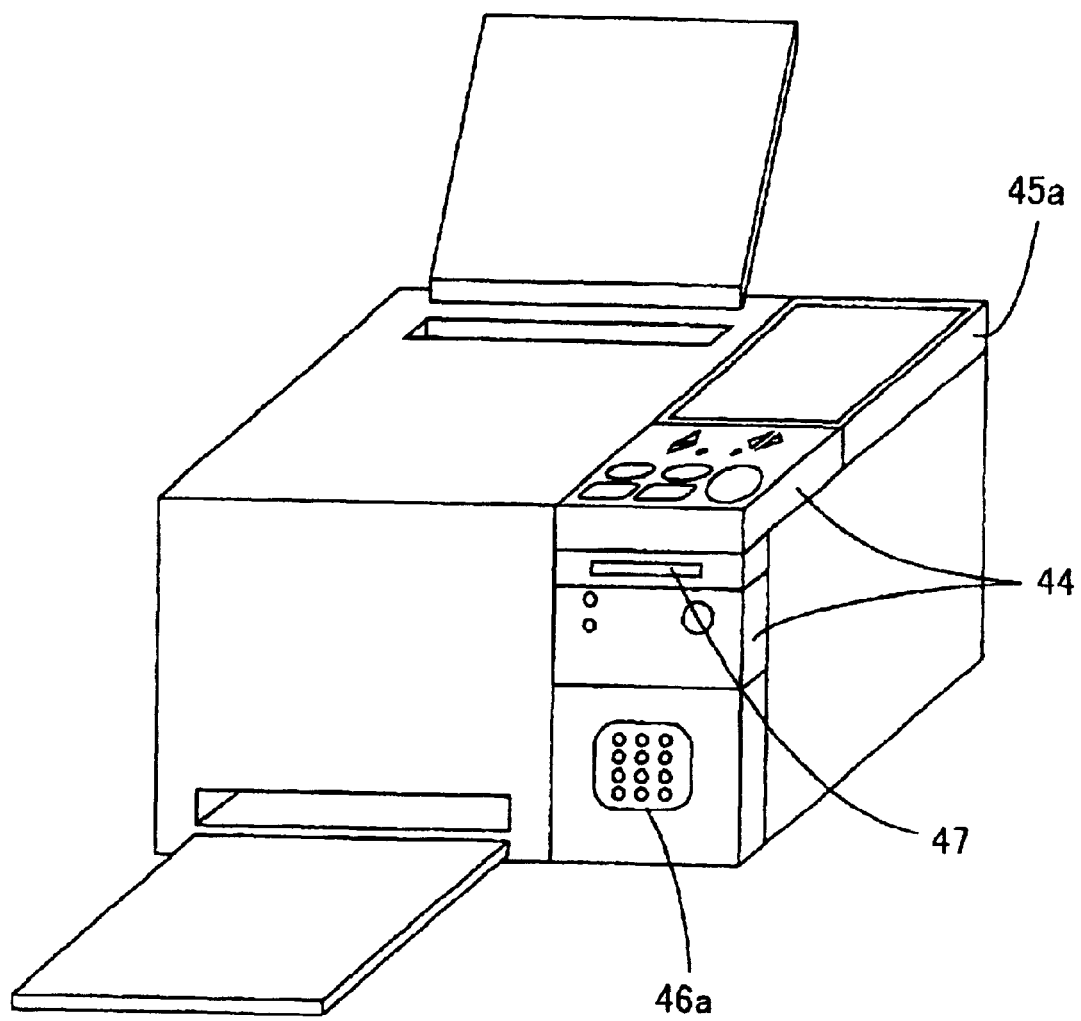
FIG. 2 shows an external perspective view of the printer.

FIG. 1 is a schematic block diagram of a color ink jet printer to which is applied an image feature amount acquisition apparatus, which is a preferred embodiment of the invention, and FIG. 2 shows an external perspective view of the printer.

Referring to FIG. 1, the printer 10 comprises a mechanical controller section 20, a high-speed serial I/O 30 and a controller section 40. The mechanical controller section 20 is a usual color ink jet printer having a head unit 22 driven by a motor 21 and a paper feed unit 23, and a mechanical controller CPU 24 drives the motor 21 and the head unit 22 to execute printing. This control is carried out by executing firmware recorded in a ROM 26 while using a RAM 25 as a work area. The mechanical controller CPU 24 receives prescribed print data to execute printing, and the print data are generated by the controller section 40 and entered via the high-speed serial I/O 30.

The controller section 40, as the core of print control, is provided with a controller CPU 41 for executing various controls, a RAM 42 as a work area, and a ROM 43 in which a print control program, firmware and data are recorded. For a usual printer, the role of the controller section 40 is performed by an external host computer. It is inconceivable for such a host computer, in which an adequate RAM capacity is secured, to run into a RAM capacity shortage during the execution of printing, because it has abundant RAMs of its own and, even if their capacity runs short, swapping with a hard disk or the like is possible. By contrast, the memory capacity of the controller section 40 is limited to the minimum requirement for a printer, may run into an absolute shortage and, even though it proves too small, there is no external storage unit with which swapping is possible. Therefore, consideration should be given to memory capacity saving in every way of processing. Incidentally, where an application is to handle images in the host computer, there is an additional advantage that the format of image data need not be particularly taken into account. That is to say, because the operating system develops such an image format, the application in this case need only to process images as bit map images.

There are further provided for interfacing with outside an input switch unit 44 for operation by the user, an LCD/LED unit 45 for displaying the state of setting and the like, an audio decoder IC 46 for orally explaining how to operate, and a PC card slot 47 to accommodate a PC card, which is a memory card on which image data are recorded.

Thus, as the user switches on a content to be printed by manipulating the input switch unit 44, the selection and other factors are consecutively displayed on the LCD/LED unit 45, at the same time the actions are announced sequentially via the audio decoder IC 46, and the selected image data are read in via the PC card slot 47 to undergo print processing.

Incidentally, as illustrated in FIG. 2, the LCD panel 45a is arranged at the top of the box on the right-hand side toward the back, the input switch unit 44, at the top toward the front and in the right-hand part of the front above about the middle of the height, a loudspeaker 46a connected to the audio decoder IC 46, on the right-hand part of the front toward the bottom, and the PC card slot 47, on the right-hand part of the front toward the top.

Figure 3:
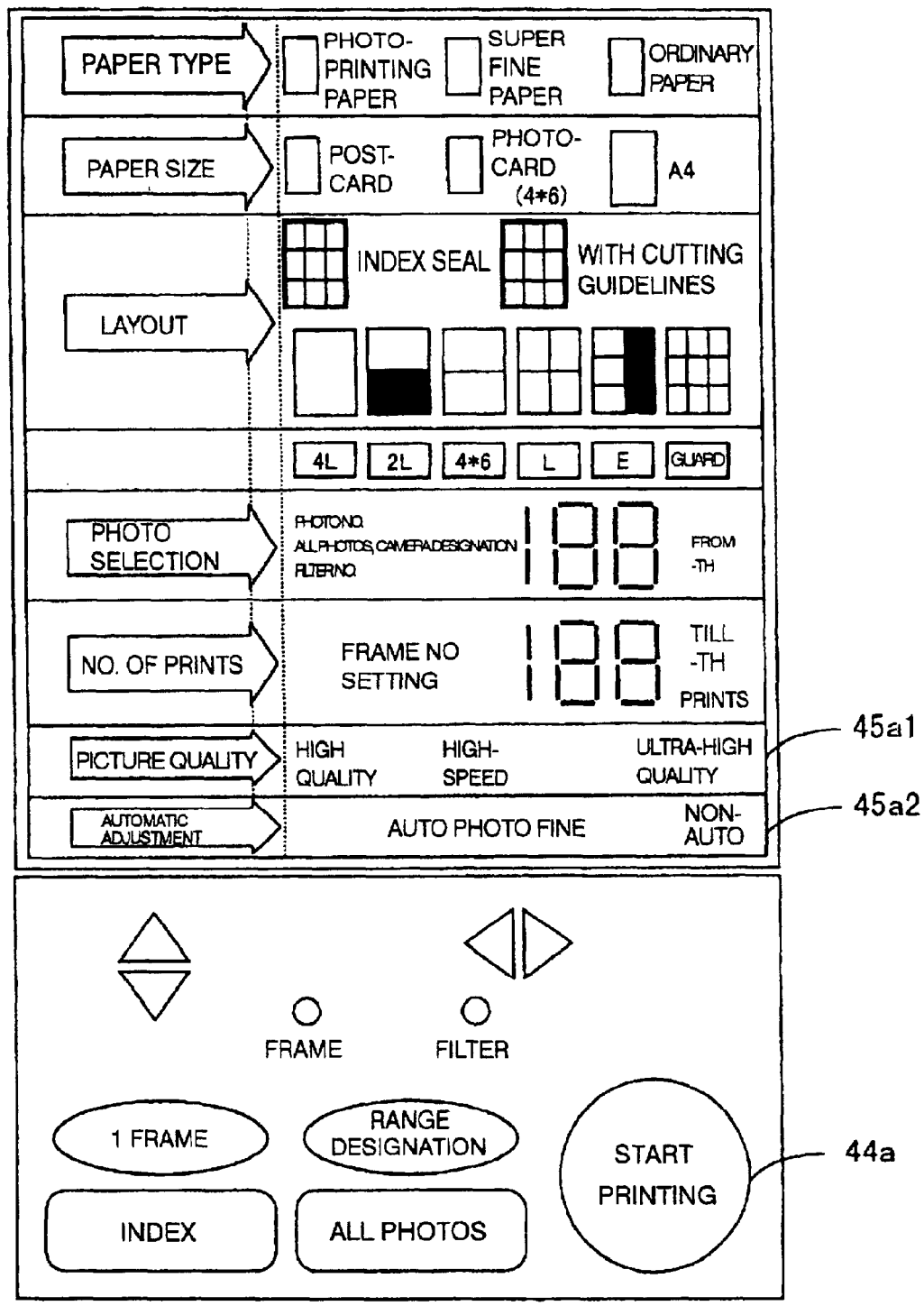
FIG. 3 partly illustrates an LCD panel and an input switch unit.

FIG. 3 partly illustrates the LCD panel 45a and the input switch unit 44, both arranged at the top of the box on the right-hand side. One of the display rows is an "image quality" row 45a1, providing for selected display out of "high quality", "high-speed" and "ultra-high quality" as opted for. If "high-speed" is opted for here, out of the available modes of image processing in the process leading to print execution, what can provide the highest speed is selected. Or if either "high quality" or "ultra-high quality" is opted for, a mode of processing which takes a longer printing time but provides the highest possible image quality is selected. The "automatic adjustment" row 45a2 is for whether or not to execute "auto photo fine", which evaluates the image and automatically set the optimal parameters for correction. For the evaluation of the image, the result of statistical calculation processing of image data is used. Whereas the object of statistical calculation differs with how the image is to be retouched, statistical calculation of luminance distributions will be described below as an example.

The concept of statistical calculation here is to be construed in a broad sense, and any statistical computation in a broad sense, including statistical processing, would fit the concept. Statistical calculation processing in turn refers to figuring out of the result of statistical calculation some characteristics or trends inherent therein.

Figure 4:
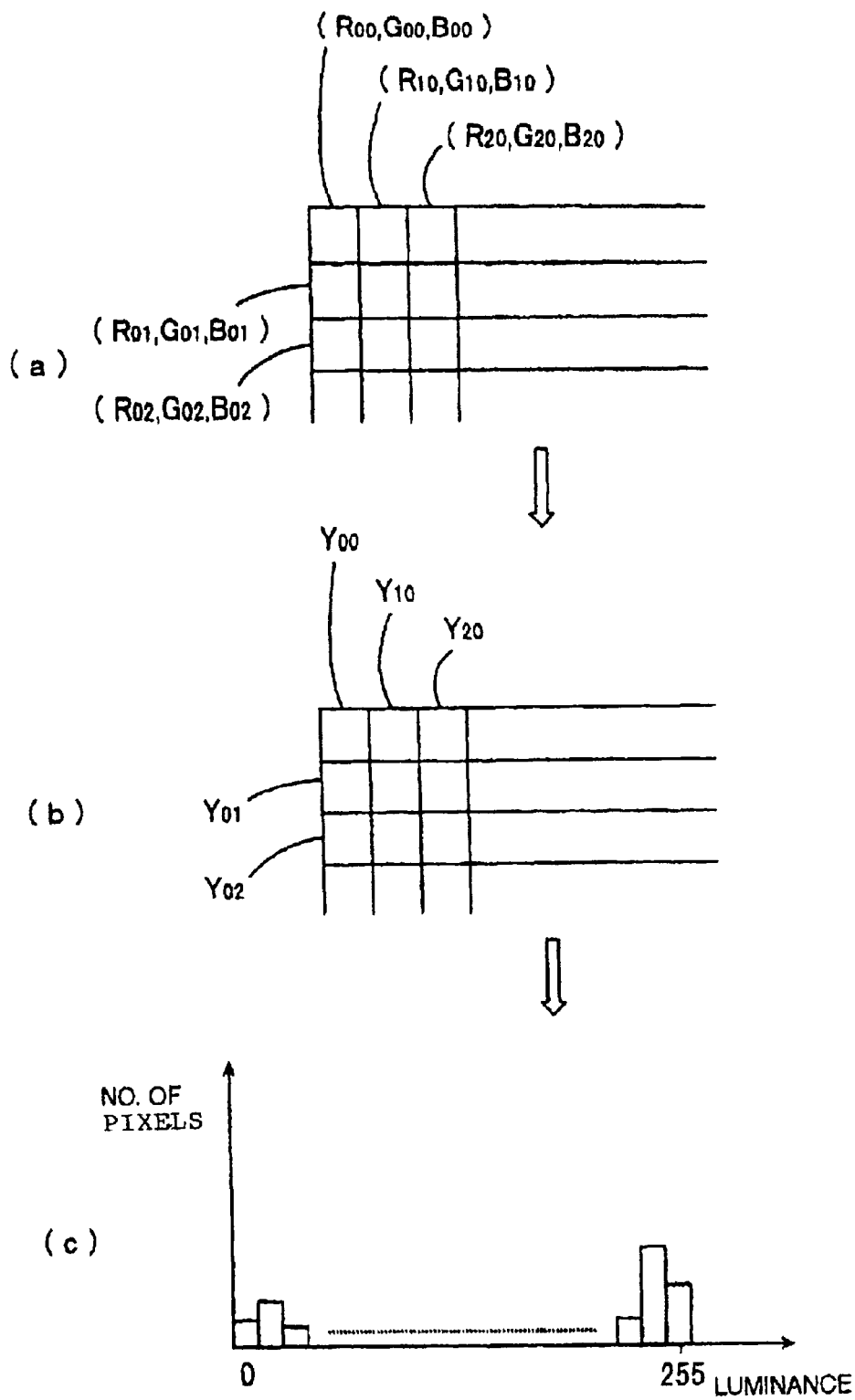
FIG. 4 schematically illustrates statistical calculation processing.

FIG. 4 schematically illustrates the flow of statistical calculation processing. An image is represented by pixels in a dot matrix form and, if the image is a photograph, the pixels are often expressed in RGB data of 256 tones. Therefore, pixels of the original image data are expressed in xy coordinates as shown in FIG. 4(a), and (Rxy, Gxy, Bxy) data are provided for each pixel. If the image data had luminance as one of their elements, direct statistical calculation would be possible, but they do not directly have luminance values. Generally, the following conversion formula is used to figure out luminance values in a simple process. Incidentally, luminance itself is also expressed in 256 tones.

$$Yxy=0.30Rxy+0.59Gxy+0.11Bxy$$

As there is no need to determine the luminance so strictly, the following formula may be used alternatively:

$$Y=(Rxy+Gxy+Bxy)/3$$

Or, in view of the difference in weight among the components, the G component alone may be used for approximation:

$$Y=Gxy$$

The state in which luminance has been converted in this manner is shown in FIG. 4(b). In order to know features of an image, it is effective to find out the luminance distribution, and accordingly a histogram will be drawn as shown in FIG. 4(c).

Figure 5:
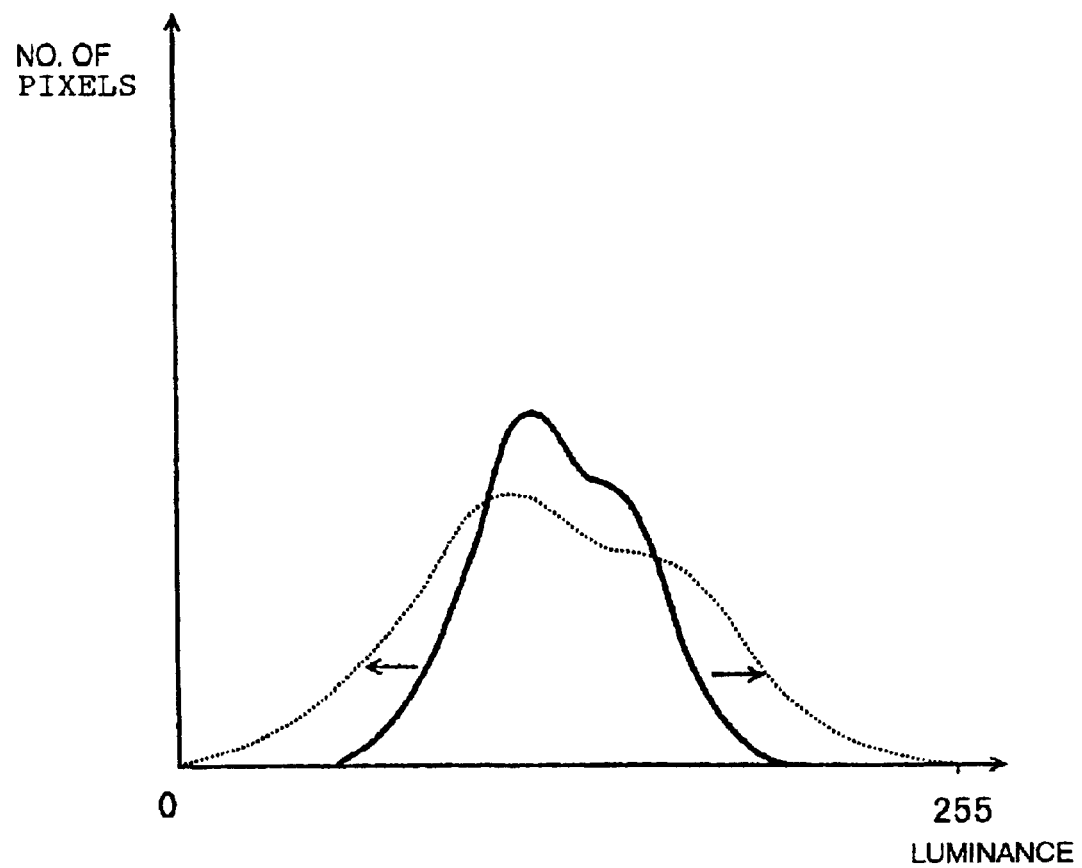
FIG. 5 illustrates contrast reinforcement processing.
Figure 6:
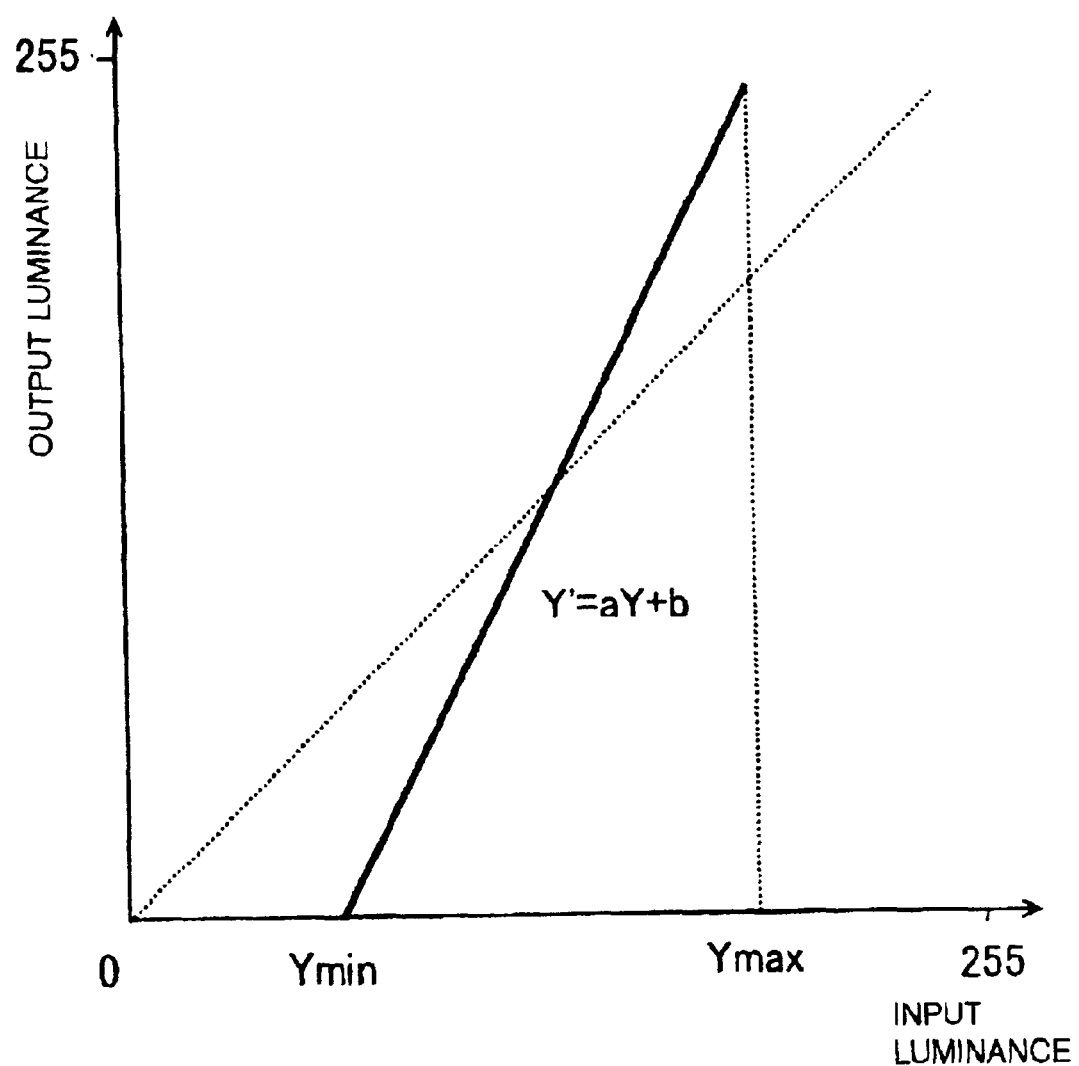
FIG. 6 illustrates a contrast reinforcing technique.

FIG. 5 illustrates a technique to correct a less contrasty image represented by a histogram into a more contrasty image in terms of the relationship of contrast to the histogram, and FIG. 6 schematically illustrates a specific computing technique. A less contrasty image, as illustrated in FIG. 5, is narrower in the peak of the histogram resulting from statistical calculation by luminance distribution, and expanding the width of this peak would make it more contrasty. Further, this conversion can be accomplished linearly in a relationship of:

$$Y'=aY+b$$

where Y' is the luminance value after the conversion of the input luminance Y. The difference in the number of pixels between the maximum luminance Ymax and the minimum luminance Ymin of the pre-conversion is increased if a>1. The range of luminance distribution Ydif being the difference between the maximum luminance Ymax and the minimum luminance Ymin, the following equation holds:

$$Ydif=Ymax-Ymin$$

This luminance distribution range Ydif is a feature amount obtained by the statistical calculation of image data, and to increase the contrast expansion on the basis of the luminance distribution range Ydif an inclination a and an offset b are determined. If, for instance, the following is supposed:

$$a=255/(Ymax-Ymin)$$

$$b=a \cdot Ymin \text{ or } 255-a \cdot Ymax$$

a narrow luminance distribution range can be expanded. In order that the highlight part may not become blurred in white or the darkest shadow part may not become smeared out in black, about "5" each in luminance value is left intact as areas where expansion is not allowed to take place toward the upper and lower ends of the gradation. As a result, the parameters of the conversion formulas will read as follows:

$$a=245/(Ymax-Ymin)$$

$$b=5-a \cdot Ymin \text{ or } 250-a \cdot Ymax$$

In this case conversion is refrained from in the ranges of Y<Ymin and Y>Ymax. Further in carrying out such conversion, there is no need to perform computation every time, but a conversion table is prepared in advance.

Figure 7:
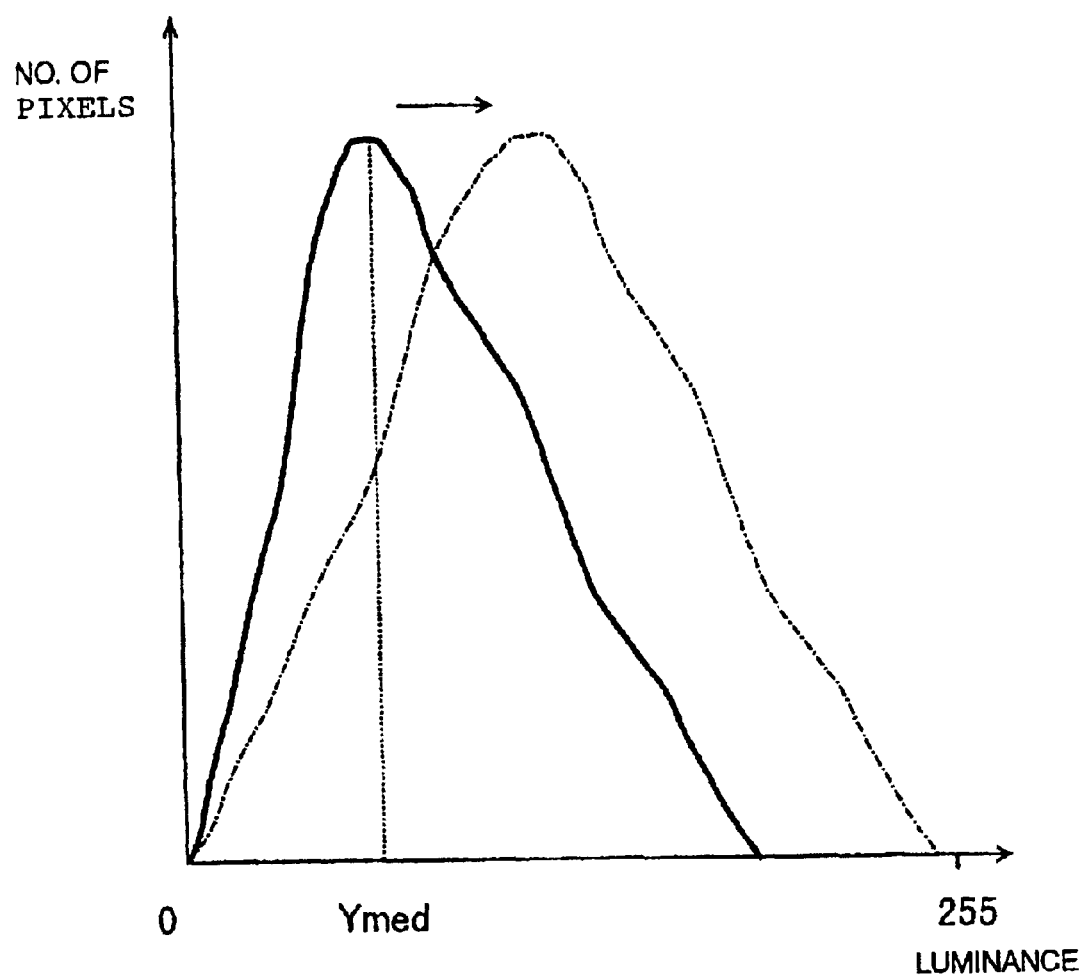
FIG. 7 illustrates lightness correction processing.
Figure 8:
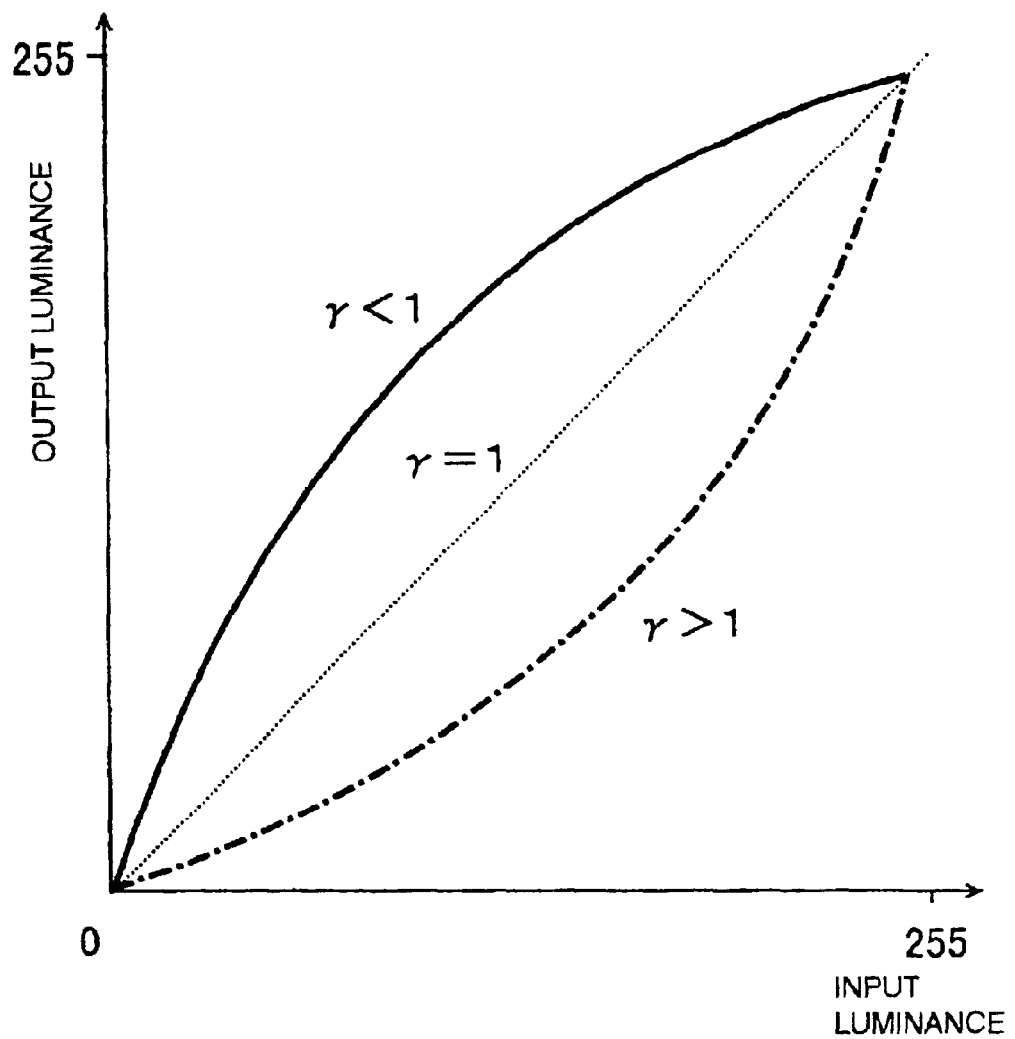
FIG. 8 illustrates a lightness correction technique.

The statistical calculation result of the histogram can also give indicators for lightening or darkening the image. Whereas FIG. 7 shows a luminance histogram, where the peak of luminance distribution is generally closer to the dark side as represented by the solid line, the peak can be generally shifted toward the lighter side as represented by the one-dot chain line. Of course, the reverse is also possible. In such a case, instead of carrying out linear luminance conversion as shown in FIG. 6, luminance conversion utilizing a so-called γ curve as illustrated in FIG. 8 can be performed. Correction with a γ curve would make the image generally lighter where γ is smaller than 1 or darker where γ is greater than 1.

Whether to lighten it is judged by a median Ymed obtained from the histogram. The ideal value of lightness being represented by Ymed_target, the difference therefrom (Ymed_target−Ymed) is calculated. Although "106" is used as the actual value of the ideal value Ymed_target, this is nothing fixed. According to whether the median Ymed is greater than the ideal value Ymed_target, the relative lightness of the image is evaluated. If, for instance, the median Ymed is "85", it is smaller than the ideal value Ymed_target of "106", it is primarily evaluated as being "dark" and the secondary level of darkness is numerically expressed as "106-85". The γ value can be automatically set as follows, for example:

$$\gamma=Ymed/106 \text{ or}$$

$$\gamma(Ymed/106)**(\tfrac{1}{2})$$

Automatic image retouching can also cover saturation, sharpness and other factors in addition to lightness, but its description is dispensed with here.

In this embodiment, only when "auto photo fine" is opted for and then "high-speed" is chosen, statistical calculation is accomplished using thumbnail data.

Figure 9:
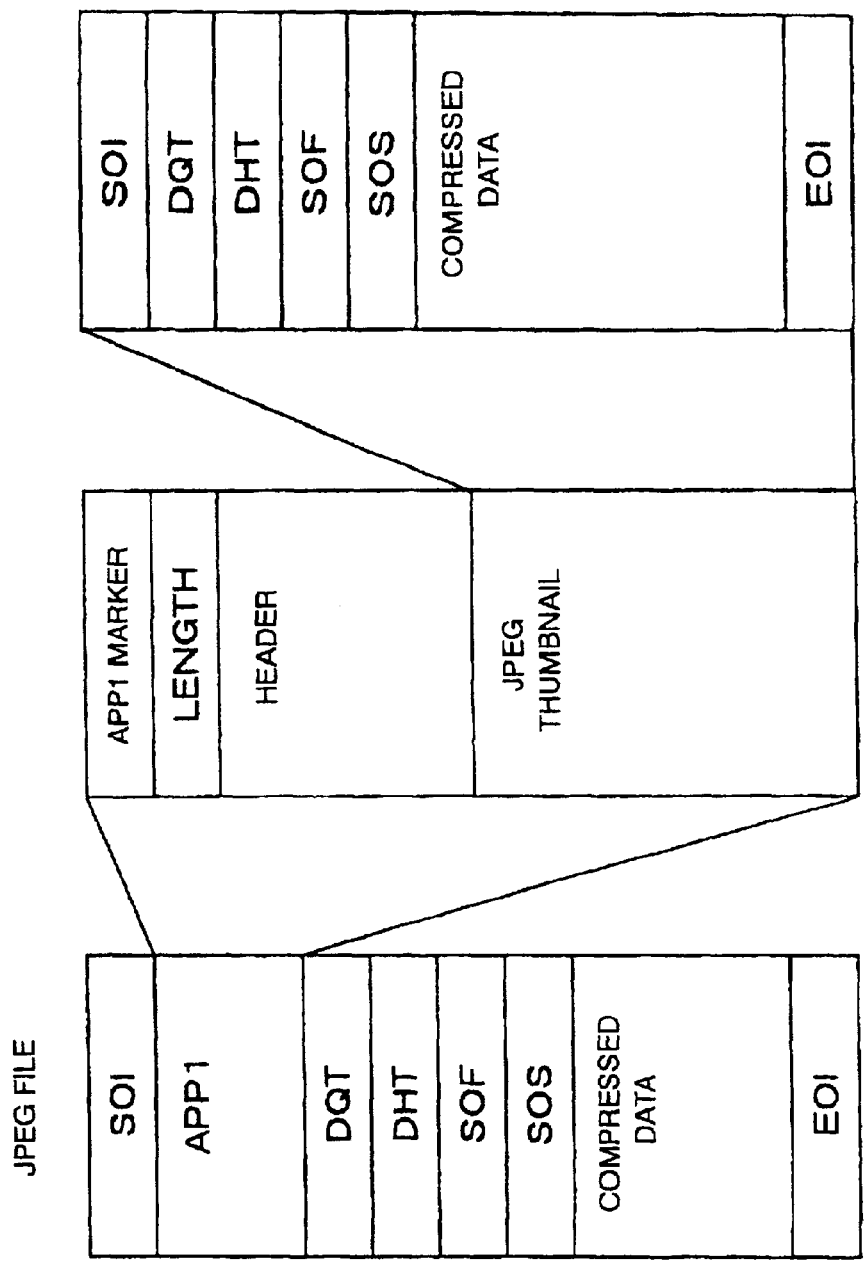
FIG. 9 illustrates the structure of a JPEG file.
Figure 10:
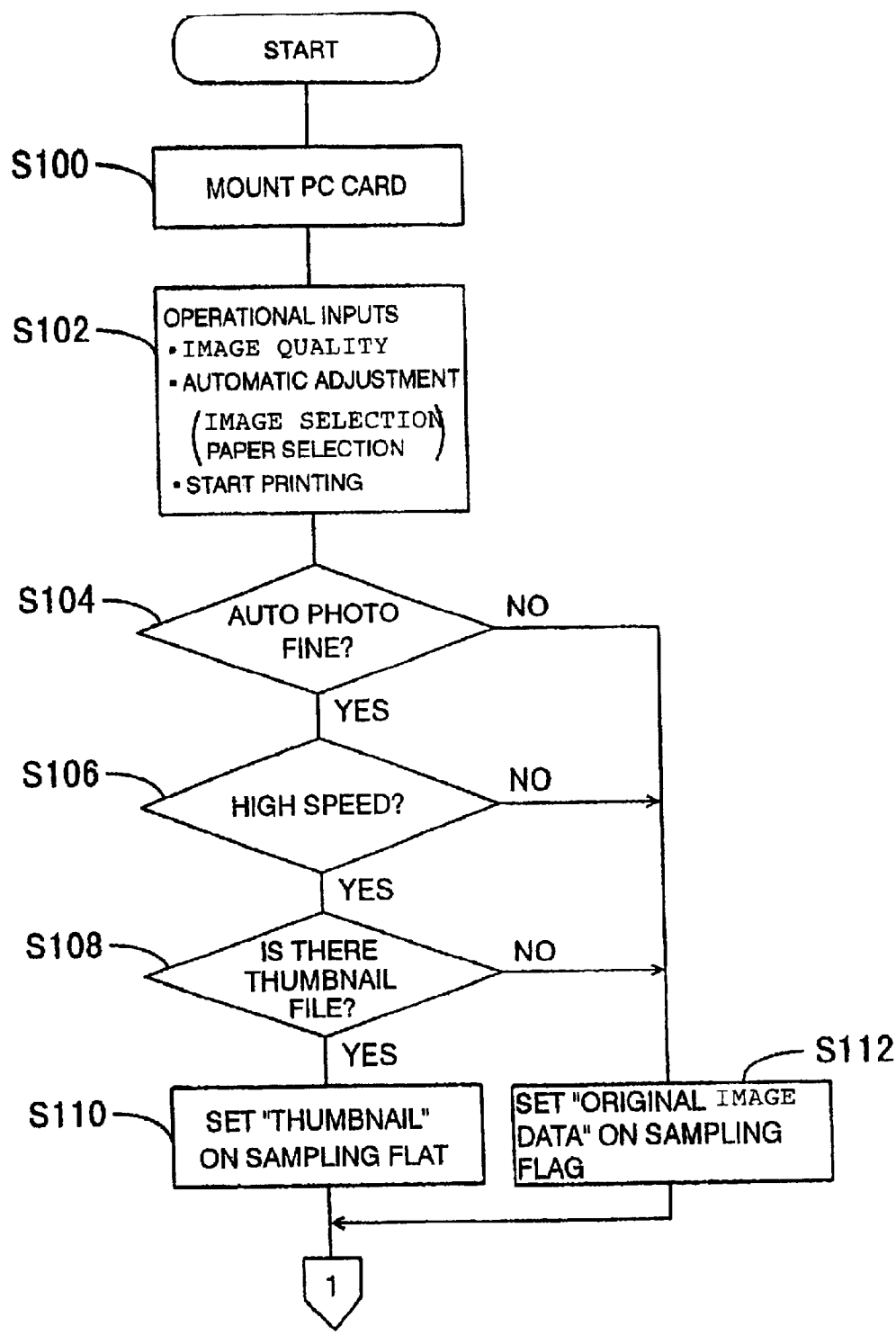
FIG. 10 is a partial flowchart of print processing.
Figure 11:
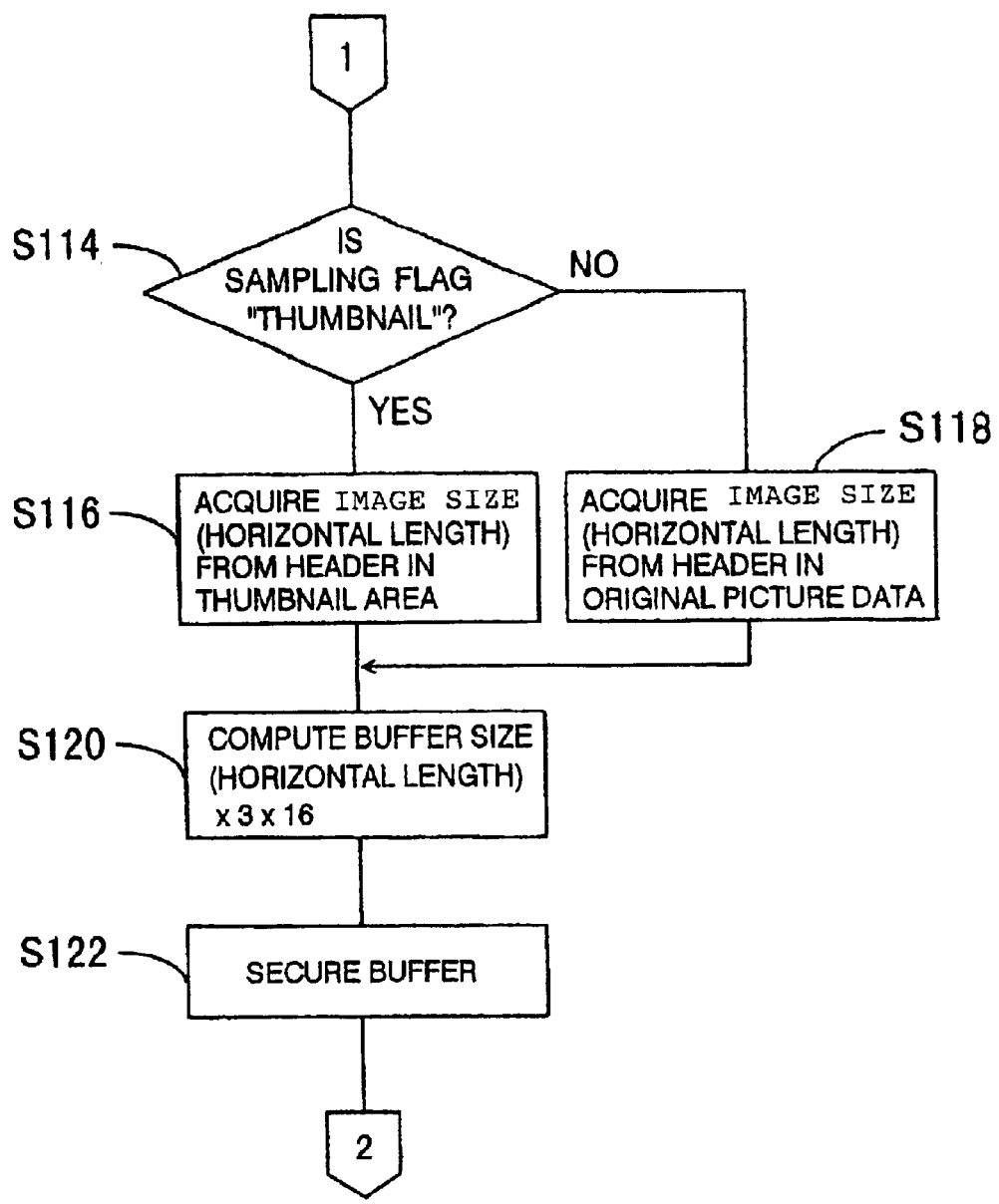
FIG. 11 is another partial flowchart of print processing.

FIG. 9 illustrates of the configuration of a JPEG file, which includes image data read in via the PC card slot 47. Already, JPEG files are commonly used for photographic image data because they permit a high degree of compression. Restoration of the image requires at least a quantization table and a Huffman table, which are provided in the so-called header area. It is also possible to arrange an extended area, application data for instance in the header area. The left-hand column of FIG. 9 illustrates the simplest composition, wherein a header area comprising an application data area APP1, quantization table area DQT, a Huffman table area DHT, a frame header SOF and a scan header SOS area is arranged between an SOI marker and an EOI marker indicating the leading and trailing edges of compressed data (quantized data), followed by an area of compressed data. To add, the compressed data are generated for every block of 8×8 pixels, for example, and constitute MCU data in each block.

In the application data area APP1, as shown in the middle column of FIG. 9, the APP1 marker is arranged at the time, immediately followed by the length of the application data area APP1 (LENGTH), and various items of information can be arranged in the area secured by LENGTH.

Previously, how to use this area was left to the choice of each individual company, and it was used diverse ways, differing from one company to another, but the use has come to be increasingly standardized, and in many cases, JPEG thumbnail data are arranged here. In this case, following a header indicating that the application data area APP1 is used in that way, JPEG thumbnail data are arranged.

The format of JPEG thumbnail data, as illustrated in the right-hand column of FIG. 9, is in no way different from that of the original image data, though the technique of preparing thumbnail differs from company to company. It is possible, for instance, to prepare thumbnail data merely by sampling according to the contraction ratio, or somewhat intermediate pixels may be generated between the original pixels and thumbnail pixels through interpolating computation between converted images. Whereas these differences do make differences in statistical calculation processing for identifying the features of the original image, this point will be elaborated upon afterwards.

If the JPEG file has such JPEG thumbnail data, it is possible to accomplish statistical calculation by using the thumbnail data, or even if the above-stated conditions are satisfied, statistical calculation using thumbnail data is impossible when the JPEG file has no thumbnail data. Incidentally, thumbnail data need not be always JPEG-compressed, because, as the number of pixels is small, providing them as bit map image data would not increase the overall volume of the file.

Further, in the following description, an image of JPEG-compressed data as such will be referred to as the original image and the original image data, and an image of JPEG thumbnail data, as the thumbnail image and the thumbnail data.

FIGS. 10 through 13 show the procedure of printing by the printer 10 in a flowchart form. The process leading to specific execution of printing will be described below with reference to these flowcharts. Incidentally, it is supposed that, after the power supply is turned on, the controller CPU 41 and the mechanical controller CPU 24 are initialized at first.

At step S100, the PC card slot 47 stands by for the insertion of a PC card on which image data are recorded. At step S102 (selecting means) after the insertion of card, actions to select the image quality and the use of automatic adjustment are accepted. In an actual process the photograph to be printed or the kind of paper to print on are selected, but it is assumed here that they are appropriately selected. Then, as a start printing key 44$a$ arranged on the input switch unit 44 is pressed, the processing described below is started.

From steps S104 through S108, conditions for executing statistical calculation processing should be determined on the basis of thumbnail data. Since the standards on the preparation of thumbnail data are not unified as stated above, no determination can be made. Therefore, even if the original image data are to be subjected to statistical calculation processing as a premise of automatic adjustment, it should be unknown whether these thumbnail data can be used in statistical calculation. For instance, if the statistical calculation as it should be is accomplished by sampling the original image data, there should no substantial difference in the statistical calculation result if the thumbnail data are obtained by sampling the original image data. However, if the number of colors is reduced or sharpness is adjusted when generating thumbnail data, the result will be different from the image data resulting from the sampling and statistical calculation of the original image data, and accordingly the statistical calculation result should also deviate. Therefore, unless these points are verified in advance, thumbnail data should be unavailable for use in statistical calculation.

However, if there is a situation in which priority is given to high speed and deterioration in image quality is permissible in some cases, the use of thumbnail data will be of great value. For this reason, execution of "auto photo fine" is opted for as automatic adjustment at step S104, and the substantial condition that "high-speed" which can be by no means superior in image quality is established at step S106. If the physical condition that the JPEG file contains thumbnail data is further established at step S108 (thumbnail presence/absence judging unit), "thumbnail" is set on a flag indicating the type of sampling (sampling flag) at step S110. If any one of the conditions fails to be met, "original image data" is set on the flag at step S112. Since, of course, it is sufficient for the flag to be set with bits, substantially a "1" bit flag is used.

Once the method of statistical calculation is decided upon, the flag is referenced at step S114, and preparation is made for securing a buffer at step S116 through step S122. Since this printer 10 has to save memory capacity, the image data cannot be developed on the memory. On the other hand, if at least an equivalent of two horizontal rows of MCU blocks can be developed, print processing and statistical calculation processing can be realized covering boundaries as well. Therefore, the buffer is secured on the basis of the horizontal length of the image to be developed.

Where thumbnail data are to be subjected to statistical calculation, an image size is acquired from the header of thumbnail area at the step S116. In this case, as shown in the right-hand column of FIG. 9, the header of the JPEG thumbnail area recorded in the application data area APP1 is read in. Or where the original image data are to be sampled for statistical calculation, the image size is acquired from the header of the compressed data for the original image data at step S118. Thus the header shown in the left-hand column of FIG. 9 is read in.

In these cases, for the image size only the horizontal length is referenced, and two-column equivalent of MCUs make up 16 columns, each requiring three RGB bytes. Accordingly, the buffer size is:

(Horizontal length)×3×16 bytes

If the original image consists of 2,000,000 image elements (1600×1200 (pixels)):

1600×3(bytes)×16(columns)=75 K(bytes)

Or if a thumbnail image consists of 160×120 (pixels):

160×3(bytes)×16(columns)=7.5 K(bytes)

Thus, the use of thumbnail data in statistical calculation reduces the required buffer size to $\frac{1}{10}$. At step S122, a buffer of the required size so determined is secured.

Figure 12:
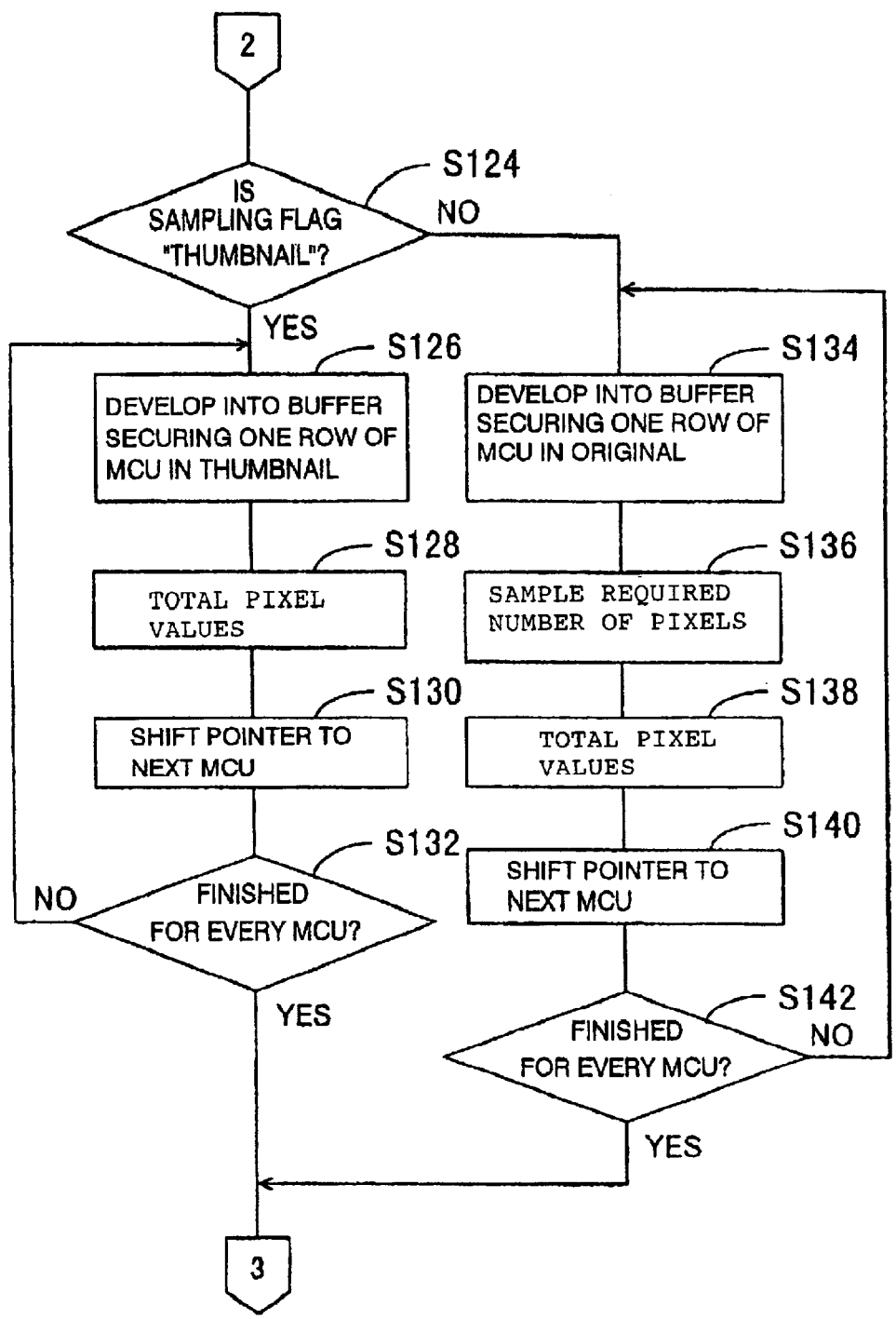
FIG. 12 is still another partial flowchart of print processing.
Figure 13:
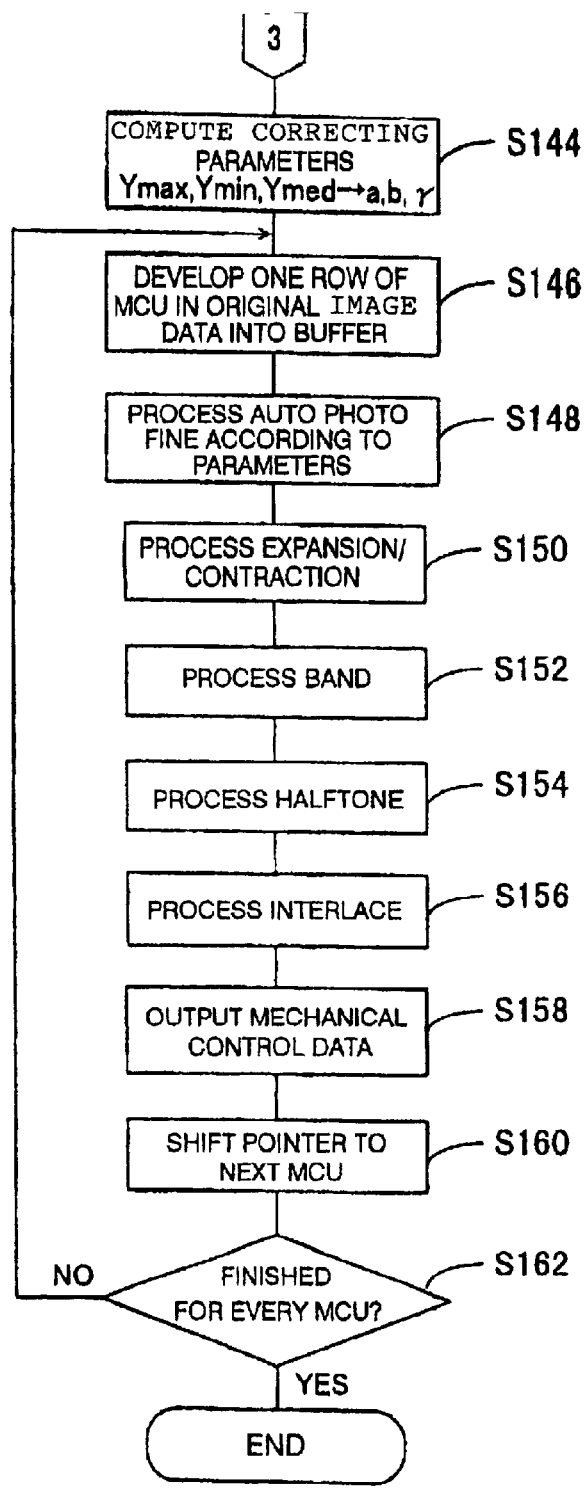
FIG. 13 is yet another partial flowchart of print processing.

Next, statistical calculation processing is carried out at step S124 through step S142 shown in FIG. 12.

At step S124 (statistical calculation selecting unit) the sampling flag is referenced and, if "thumbnail" is set, steps S126 through S132 (thumbnail statistical calculation unit) are repeated to perform statistical calculation for the pixel values of thumbnail data. First at step S126, a one-column equivalent of MCUs in thumbnail data is read in, and subjected to JPEG development into the buffer.

In the state developed in the buffer, tone values of the pixels can now be referenced, and at step S128 statistical calculation is performed for the pixel values. On this occasion, no sampling is done, but the statistical calculation is performed for all the pixels. The statistical calculation is processed to obtain the aforementioned luminance histogram and, after the luminance values of the pertinent pixels are figured out, the contents of various of the relevant tone values, out of the variables one of which is provided in advance for tone value, are incremented.

Upon completion of the statistical calculation of all the pixels for a one-column equivalent of MCUs, the pointer is shifted to the MCUs of the next column at step S130. Since the vertical length becomes known when the image size is read in, the MCU in the ending position can be identified. Therefore, whether the development of all the MCUs has been completed is judged by referencing the shifted pointer and, if not, the process returns to step S126 to develop the next one-column equivalent of MCUs. Or if it has been completed, a histogram is prepared. Since statistical calculation is already completed, the process goes ahead to print processing from step S144 onward.

On the other hand, if "thumbnail" is not set on the sampling flag at step S124, steps S134 through S142 (sampling statistical calculation unit) are repeated so that statistical calculation is performed for the pixel values of the original image data. At step S136, a one-column equivalent of MCUs in the original image data is read in, and subjected to JPEG development into the buffer. As the number of pixels is so much greater in the original image data that statistical calculation of all the pixels would take too long a time, the required number of pixels are sampled at step S136. For this sampling, either the pixels to be sampled may be determined by using random numbers, or a sample pixel may be determined for every fixed number of pixels. The sampling method can be altered as appropriate. Once the pixels for which statistical calculation is to be performed are determined, statistical calculation is performed for the pixel values at step S138.

After that, as in the case of thumbnail data, the pointer is shifted at step S140, and at step S142 it is judged whether statistical calculation has been completed for all the MCUs to decide whether to repeat steps from S134 onward or to go ahead to print processing.

Here, whether thumbnail data or the original image data are subjected to statistical calculation, the number of pixels for which statistical calculation is to be performed does not necessarily differ. Thus, it seems that, if as many pixels in the original image data as pixels in thumbnail data are sampled, the processing itself needed for statistical calculation is basically the same. However, as illustrated in FIG. 9, JPEG thumbnail data are present only in an area of a relatively small capacity in the application data area APP1 on the leading edge side of the JPEG file. Consequently, the quantity of data which have to be read out for JPEG development is not so great, and the time taken to access the file is short. By contrast, for the original image data, all the compressed data should be read in for JPEG development, resulting in a large quantity of data to be accessed and a long time taken by processing. In this respect, statistical calculation on thumbnail data contributes to the achievement of "high speed".

The result of statistical calculation at step S128 or step S138 is a histogram, such as the one shown in FIG. 4(c). At step S144 (feature amount acquisition unit), correcting parameters are computed for automatically correcting the original image data in starting print processing.

The correcting parameters for automatically correcting contrast are "a and b", and execution of the above-cited formula requires determination of the maximum luminance Ymax and the minimum luminance Ymin from the histogram. However, the pixels of snow white noise and pitch black noise are respectively "255" and "0" in tone value, so that if the real maximum and minimum are selected, in most cases the maximum luminance Ymax will be "255" and the minimum luminance Ymin, "0". For this reason, in addition to statistical calculation processing, 0.5% each of pixels at the upper and lower ends is ignored as statistical processing to determine the maximum luminance Ymax and the minimum luminance Ymin. This serves to eliminate the pixels of noise, and satisfactory maximum luminance Ymax and minimum luminance Ymin for expressing an approximate luminance distribution range can be thereby obtained.

Next the median Ymed is determined to calculate γ. For the median, there is no need to take particular account of pixels of noise. However, if the Ymed is far away from the optimum of "106", the contrast correcting parameters may be computed after subjecting the data of the histogram to γ correction to correct the distribution and then obtaining the maximum luminance Ymax and the minimum luminance Ymin on that basis.

Once the correcting parameters a, b, and γ have obtained in the above-described manner, the loop of steps S146 through S162 is repeated to execute printing. When printing is done with a usual host computer, because there is no buffer constraint, all the objects on each page are developed page by page to develop a screen image. However, this printer 10 has only a few RAMs 42 and cannot resort to swapping with a hard disk or the like. For this reason, the development of the image is kept to the minimum required for printing, and at step S146 the original image data are developed into the buffer for each column of MCUs at a time.

As the image is developed in the buffer in a bit map image form, image processing is executed at step S148 on the basis of the earlier obtained correcting parameters. Since expansion of the contrast range and the correction of lightness exist only within the range of 256 tones either before or after conversion, the conversion result is computed in advance for every tone, and a look-up table is prepared in terms of correspondence relationship. Then, correction processing needs only to reference the table by the pre-conversion luminance and to read out the corresponding post-conversion luminance.

After having accomplished such "auto photo fine" processing on all the pixels, expansion/contraction processing is carried out at step S150. For use in the expansion/contraction processing, a number of different methods of interpolating computation are available, including bicubic interpolation or nearest method, one of which can be chosen according to the scale factor. Where the rate of expansion is high, for example, bicubic interpolation is preferable.

Whereas the expansion/contraction processing gives the resolution at the time of actual printing, the buffer for this purpose has the buffer printer 10's own resolution, which therefore is fixed. In this embodiment, either 720 dpi or 1440 dpi can be selected. Where "ultra-high quality" is selected as the image quality mentioned above, a buffer matching 1440 dpi is secured, and in other cases, a buffer matching 720 dpi is secured.

At step S152, processing is divided into different bands needed for the execution of printing. Therefore, color conversion and halftone processing the following step S154 and interlace processing at step S156 are similarly accomplished. When the required quantity of print data matching band processing has been prepared, mechanical control data output processing at step S258 is executed, and print data are supplied from the controller CPU 41 to the mechanical controller CPU 24 via the high-speed serial I/O 30. These print data are developed in the buffer of the RAM 25, and the mechanical controller CPU 24 references these data to execute the drive control for the motor 21 and the head unit 22.

In parallel with this drive control by the mechanical controller section 20, the controller section 40 shifts the pointer to the next MCU at step S160 to generate further next print data, and repeats that until it is judged at step S162 that the processing has been completed for all the MCUs.

Figure 14:
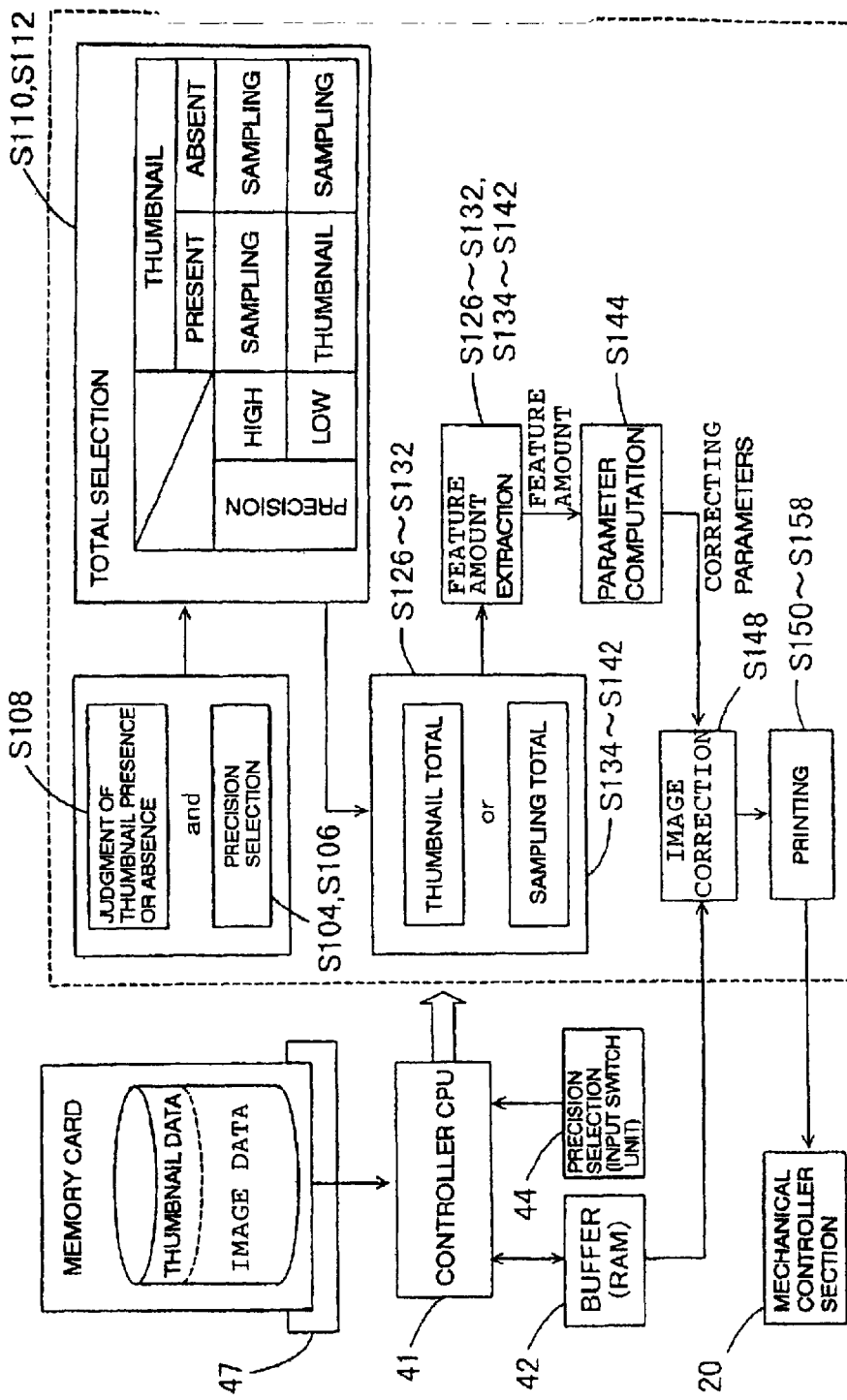
FIG. 14 schematically illustrates the invention.

FIG. 14 is a diagram schematically illustrating the present invention. In hardware aspect, the controller CPU 41 can read compressed image data from a PC card, on which an image is recorded, via the PC card slot 47, and can develop the compressed image, which has been read in, into the buffer of the RAM 42 in prescribed smallest units. The operation of the input switch unit 44 performs the function of selecting the precision level, and the controller CPU 41 can detect the state of precision level selection on the basis of how the input switch unit 44 is operated. Further, supply of print data on a band-by-band basis to the mechanical controller section 20 results in execution of printing.

In the software aspect, the controller CPU 41 judges the presence or absence of thumbnail data in the image data recorded on the PC card (step S108) and judges what level of precision should be selected (step S104 and step S106), and selects the object of statistical calculation on the basis of the respective judgment (step S110 and step S112). The statistical calculation choice is shown in the table in FIG. 14. Only where there are thumbnail data and the selected level of precision is low, the thumbnail statistical calculation is selected, and in other cases the sampling and statistical calculation is chosen. On the basis of this statistical calculation choice, either thumbnail statistical calculation (step S126 through step S132) or sampling and statistical calculation (step S134 through step S142) is executed, and this statistical calculation in itself constitutes extraction of a feature amount, whose result is used for the computation of correcting parameters (step S144)).

Next, while correcting the image of the minimum bit map image developed in the buffer by using the computed correcting parameters, print data are successively generated on a band-by-band basis (step S150 through step S158), and transferred to the mechanical controller section 20 to execute printing.

If high-speed processing is preferred in acquiring a feature amount of the image for automatic correction of the image data, it is judged whether thumbnail data are contained in the image data (step S108) and, if thumbnail data are contained, "thumbnail" is set on the sampling flag (step S110) to secure a buffer for development use matching thumbnail data (step S116 and step S120), followed by development of the thumbnail data in the buffer and statistical calculation of all the image elements (step S126 through step S132). This results in fast processing than where the original image data are developed and sampled.

I claim:

1. An image feature amount acquisition apparatus for acquiring a feature amount of an image by subjecting image data of the image expressed in pixels in a dot matrix form to statistical calculation processing, the apparatus comprising:
    a thumbnail presence/absence judging unit which judges whether said image data have thumbnail data in addition to an original image data;
    a precision selecting unit which selects a level of precision required for said feature amount;
    a statistical calculation selecting unit which selects either a thumbnail statistical calculation unit or a sampling and statistical calculation unit by using the result of selection by said precision selecting unit and the result of judgement by said thumbnail presence/absence judging unit, wherein
        said thumbnail statistical calculation unit acquires thumbnail data from said image data and performs statistical calculation for the thumbnail data; and
        said sampling and statistical calculation unit samples said original image data and performs statistical calculation for the sampled data; and
    a feature amount acquisition unit which acquires a feature amount characterizing said original image data by using the selected statistical calculation result obtained from one of said thumbnail statistical calculation unit and said sampling and statistical calculation unit.

2. An image feature amount acquisition apparatus, as claimed in claim 1, wherein said statistical calculation selecting unit selects said thumbnail statistical calculation unit when there are said thumbnail data and the level of precision required for said feature amount is not so high and selects said sampling and statistical calculation unit in other cases.

3. An image feature amount acquisition apparatus, as claimed in claim 1, wherein the precision level of said feature amount matches an image quality required in image correction processing.

4. An image feature amount acquisition apparatus, as claimed in claim 1, wherein said thumbnail data are recorded in a compressed form, and said thumbnail statistical calculation unit develops with respect to compressed thumbnail data pixels equivalent to a prescribed number of lines, performs statistical calculation for the developed image data and repeats this sequence until it is finished for all the lines.

5. An image feature amount acquisition apparatus, as claimed in claim 4, wherein said thumbnail statistical calculation unit secures a buffer in which at least two units of bit map images each in the smallest developable unit can be recorded, develops the bit map images in succession and performs statistical calculation for the developed bit map images.

6. An image feature amount acquisition apparatus, as claimed in claim 4, wherein said thumbnail statistical calculation unit acquires an image size in advance, and starts statistical calculation after computing and securing a required buffer capacity.

7. An image feature amount acquisition method for acquiring a feature amount of an image by subjecting image data of the image expressed in pixels in a dot matrix form to statistical calculation processing, the method comprising:
    a thumbnail presence/absence judging step of judging whether said image data have thumbnail data in addition to an original image data;
    a precision selecting step of selecting a level of precision required for said feature amount;
    a statistical calculation selecting step of selecting either a thumbnail statistical calculation step or a sampling and statistical calculation step by using the result of selection at said precision selecting step and the result of judgement at said thumbnail presence/absence judging step; wherein
        said thumbnail statistical calculation step acquires thumbnail data from said image data and performing statistical calculation for the thumbnail data; and
        said sampling and statistical calculation step of samples said original image data and performing statistical calculation for the sampled data; and
    a feature amount acquisition step of acquiring a feature amount characterizing said original image data by using the selected statistical calculation result obtained from one of said thumbnail statistical calculation step and said sampling and statistical calculation step.

8. An image feature amount acquisition method, as claimed in claim 7, wherein at said statistical calculation selecting step said thumbnail statistical calculation step is selected when there are said thumbnail data and the level of precision required for said feature amount is not so high and said sampling and statistical calculation step is selected in other cases.

9. An image feature amount acquisition method, as claimed in claim 7, wherein the precision level of said feature amount matches an image quality required in image correction processing.

10. An image feature amount acquisition method, as claimed in claim 7, wherein said thumbnail data are recorded in a compressed form, and at said thumbnail statistical calculation step pixels equivalent to a prescribed number of lines are developed with respect to compressed thumbnail data, statistical calculation is performed for the developed image data, and this sequence is repeated until it is finished for all the lines.

11. An image feature amount acquisition method, as claimed in claim 10, wherein at said thumbnail statistical calculation step a buffer in which at least two units of bit map images each in the smallest developable unit can be recorded is secured, and the bit map images are developed in succession and statistical calculation is performed for the developed bit map images.

12. An image feature amount acquisition method, as claimed in claim 10, wherein at said thumbnail statistical calculation step an image size is acquired in advance, and statistical calculation is initiated after a required buffer capacity is computed and secured.

13. A medium recording thereon an image feature amount acquisition program for causing a computer to acquire a feature amount of an image by subjecting image data of the image expressed in pixels in a dot matrix form to statistical calculation processing, said program enabling a computer to realize:
    a thumbnail presence/absence judging function of judging whether said image data have thumbnail data in addition to an original image data;

a precision selecting function of selecting the level of precision required for said feature amount;

a statistical calculation selecting function of selecting and implementing either a thumbnail statistical calculation function or a sampling and statistical calculation function by using the result of selection by said precision selecting function and the result of judgment by said thumbnail presence/absence judging function; wherein said thumbnail statistical calculation function acquires thumbnail data from said image data and performing statistical calculation for the thumbnail data; and said sampling and statistical calculation function samples said original image data and performing statistical calculation for the sampled data; and a feature amount acquisition function of acquiring a feature amount characterizing said original image data by using the selected statistical calculation result obtained from one of said thumbnail statistical calculation function and said sampling and statistical calculation function.

14. A medium recording thereon an image feature amount acquisition program, as claimed in claim 13, wherein said statistical calculation selecting function selects said thumbnail statistical calculation unit when there are said thumbnail data and the level of precision required for said feature amount is not so high and selects said sampling and statistical calculation function in other cases.

15. A medium recording thereon an image feature amount acquisition program, as claimed in claim 13, wherein the precision level of said feature amount matches the image quality required in image correction processing.

16. A medium recording thereon an image feature amount acquisition program, as claimed in claim 13, wherein said thumbnail data are recorded in a compressed form, and said thumbnail statistical calculation function develops with respect to compressed thumbnail data pixels equivalent to a prescribed number of lines, performs statistical calculation for the developed image data and repeats this sequence until it is finished for all the lines.

17. A medium recording thereon an image feature amount quantity acquisition program, as claimed in claim 16, wherein said thumbnail statistical calculation function secures a buffer in which at least two units of bit map images each in the smallest developable unit can be recorded, develops the bit map images in succession and performs statistical calculation for the developed bit map images.

18. A medium recording thereon an image feature amount acquisition program, as claimed in claim 16, wherein said thumbnail statistical calculation function acquires an image size in advance, and starts statistical calculation after computing and securing a required buffer capacity.

19. An image correcting apparatus for acquiring a feature amount of an image by subjecting image data of the image expressed in pixels in a dot matrix form to statistical calculation processing, determining correcting parameters by using the feature amount, and correcting the image, the apparatus comprising:

a thumbnail presence/absence judging unit which judges whether said image data have thumbnail data in addition to an original image data;

a selecting unit which selects a level of precision required for said feature amount;

a statistical calculation selecting unit which selects either a thumbnail statistical calculation unit or a sampling and statistical calculation unit by using the result of selection by said precision selecting unit and the result of judgment by said thumbnail presence/absence judging unit; wherein said thumbnail statistical calculation unit acquires thumbnail data from said image data and performs statistical calculation for the thumbnail data; and said sampling and statistical calculation unit samples said original image data and performs statistical calculation for the sampled data;

a feature amount acquisition unit which acquires a feature amount characterizing said original image data by using the selected statistical calculation result obtained from one of said thumbnail statistical calculation unit and said sampling and statistical calculation unit;

a parameter computing unit which computes correcting parameters by using said feature amount; and an image correcting unit which subjects said original image data to image correction processing by using the computed correcting parameters.

20. An image correcting method for acquiring a feature amount of an image by subjecting image data of the image expressed in pixels in a dot matrix form to statistical calculation processing, determining correcting parameters by using the feature amount, and correcting the image, the method comprising:

a thumbnail presence/absence judging step of judging whether said image data have thumbnail data in addition to an original image data;

a selecting step of selecting the level of precision required for said feature amount;

a statistical calculation selecting step of selecting either a thumbnail statistical calculation step or a sampling and statistical calculation step by using the result of selection at said precision selecting step and the result of judgment at said thumbnail presence/absence judging step; wherein said thumbnail statistical calculation step acquires thumbnail data from said image data and performing statistical calculation for the thumbnail data; and said sampling and statistical calculation step samples said original image data and performing statistical calculation for the sampled data;

a feature amount acquisition step of acquiring a feature amount characterizing said original image data by using the selected statistical calculation result obtained from one of said thumbnail statistical calculation step and said sampling and statistical calculation step;

a parameter computing step of computing correcting parameters by using said feature amount; and an image correcting step of subjecting said original image data to image correction processing by using the computed correcting parameters.

21. A medium recording thereon an image correcting program for causing a computer to acquire a feature amount of an image by subjecting image data of the image expressed in pixels in a dot matrix form to statistical calculation processing, to determine correcting parameters by using the feature amount, and to correct the image, said program enabling a computer to realize:

a thumbnail presence/absence judging function of judging whether said image data have thumbnail data in addition to an original image data;

a selecting function of selecting a level of precision required for said feature amount;

a statistical calculation selecting function of selecting either a thumbnail statistical calculation function or a sampling and statistical calculation function by using the result of selection by said precision selecting function and the result of judgment by said thumbnail presence/absence judging function; wherein said thumbnail statistical calculation function acquires thumbnail data from said image data and performing statistical calculation for the thumbnail data; and said sampling and statistical calculation function samples said original image data and performing statistical calculation for the sampled data;

a feature amount acquisition function of acquiring a feature amount characterizing said original image data by using the selected statistical calculation result obtained from one of sai thumbnail statistical calculation function and said sampling and statistical calculation function;

a parameter computing function of computing correcting parameters by using said feature amount; and an image correcting function of subjecting said original image data to image correction processing by using the computed correcting parameters.

22. A printer which acquires a feature amount of an image by subjecting image data of the image expressed in pixels in a dot matrix form to statistical calculation processing, determines correcting parameters by using the feature amount, and corrects and prints the image, the printer comprising:

an image data selecting unit which selects image data from a memory card recording thereon the image data including an original image data in a compressed form;

an image quality selecting unit which selects a quality level of image processing;

an image data reading unit which read said selected image data out of said memory card;

a thumbnail presence/absence judging unit which judges whether said image data have thumbnail data in addition to the original image data;

a statistical calculation selecting unit which selects either a thumbnail statistical calculation unit or a sampling and statistical calculation unit by using the result of judgment by said thumbnail presence/absence judging unit and the result of selection by said image quality selecting unit; wherein said thumbnail statistical calculation unit acquires thumbnail data from said image data and performs statistical calculation for the thumbnail data; and said sampling and statistical calculation unit samples said original image data and performs statistical calculation for the sampled data;

a feature amount acquisition unit which acquires a feature amount characterizing said original image data by using the selected statistical calculation result obtained from one of said thumbnail statistical calculation unit and said sampling and statistical calculation unit;

a parameter computing unit which computes correcting parameters by using said feature amount;

an image correcting unit which subjects said original image data to image correction processing while restoring them by using the computed correcting parameters; and a printing unit which executes printing on the basis of the original image data having undergone image correction.

23. A printing method for acquiring a feature amount of an image by subjecting image data of the image expressed in pixels in a dot matrix form to statistical calculation processing, determining correcting parameters by using the feature amount, and correcting and printing the image, the method comprising the steps of:

selecting image data from a memory card recording thereon the image data including an original image data in a compressed form and further selecting the quality of image processing;

reading said selected image data out of said memory card and thereafter, judging whether said image data have thumbnail data in addition to the original image data;

selecting either statistical calculation by acquiring thumbnail data from said image data or statistical calculation by sampling said original image data, on the basis of the result of the judgment on the presence or absence of thumbnail data and said selected quality;

acquiring a feature amount characterizing said original image data by using whichever statistical calculation result is selected from either said statistical calculation by acquiring thumbnail data from said image data or said statistical calculation by sampling said original image data;

computing correcting parameters by using the feature amount;

subjecting said original image data to image correction processing by using the computed correcting parameters; and executing printing on the basis of the original image data having undergone image correction.

24. A medium recording thereon an image correcting program for causing a computer to acquire a feature amount of an image by subjecting image data of the image expressed in pixels in a dot matrix form to statistical calculation processing, to determine correcting parameters by using the feature amount, and to correct and print the image, the program being characterized in that the program enables the computer to realize:

an image data selecting function of selecting image data from a memory card recording thereon image data including an original image data in a compressed form;

an image quality selecting function of selecting a quality level of image processing;

an image data reading function of reading said selected image data out of said memory card;

a thumbnail presence/absence judging function of judging whether said image data have thumbnail data in addition to the original image data;

a statistical calculation selecting function for selecting either a thumbnail statistical calculation function or a sampling and statistical calculation function by using the result of judgment by said thumbnail presence/absence judging function and the result of selection by said image quality selecting function; wherein said thumbnail statistical calculation function acquires thumbnail data from said image data and performing statistical calculation for the thumbnail data;

said sampling and statistical calculation function samples said original image data and performing statistical calculation for the sampled data;

a feature amount acquisition function of acquiring a feature amount characterizing said original image data by using the selected statistical calculation result obtained from one of said thumbnail statistical calculation function and said sampling and statistical calculation function;

a parameter computing function of computing correcting parameters by using said feature amount;

an image correcting function of subjecting said original image data to image correction processing while restoring them by using the computed correcting parameters; and a printing function of generating and supplying print data on the basis of the original image data having undergone image correction.

* * * * *